United States Patent [19]

Beaton et al.

[11] 4,083,920

[45] Apr. 11, 1978

[54] TREATMENT OF TRI(ALKALINE EARTH METAL) TUNGSTATES WITH ACIDS

[75] Inventors: Stephen Peter Beaton, Amherstview; Hans Peter Kasserra, Brockville, both of Canada

[73] Assignee: Du Pont of Canada Limited, Montreal, Canada

[21] Appl. No.: 766,422

[22] Filed: Jan. 27, 1977

[30] Foreign Application Priority Data

Jan. 29, 1976 Canada .................................. 244540

[51] Int. Cl.$^2$ ............................................ C01G 41/00
[52] U.S. Cl. ........................................ 423/53; 423/56; 423/58; 423/61; 423/593; 423/606; 75/97 R; 75/101 R; 75/121; 75/103
[58] Field of Search ....................... 423/53, 56, 58, 61, 423/606, 593; 75/97 R, 101 R, 103, 121

[56] References Cited

U.S. PATENT DOCUMENTS

| | | | |
|---|---|---|---|
| 1,410,584 | 3/1922 | Lubowsky | 423/53 |
| 2,394,362 | 2/1946 | Burwell | 423/58 |
| 2,801,152 | 7/1957 | Kasey | 423/56 |
| 2,992,916 | 7/1961 | Newkirk | 75/121 |
| 3,457,034 | 7/1969 | Putluck | 423/56 |
| 3,510,291 | 5/1970 | Brush | 423/606 |

FOREIGN PATENT DOCUMENTS

| | | | |
|---|---|---|---|
| 494,947 | 10/1938 | United Kingdom | 423/53 |

OTHER PUBLICATIONS

Li, "Journal of Metal," June 1962, pp. 413-417.
Vezina, et al., "Transactions, Conference of Metallurgists, Ottawa," Aug. 1965, pp. 445-449.

*Primary Examiner*—Herbert T. Carter

[57] ABSTRACT

A process is provided for extracting tungsten values from tungsten compositions. The process comprises treating a tri (alkaline earth metal) tungstate, especially tricalcium tungstate, at a temperature of preferably no greater than 50° C. with a aqueous solution of hydrochloric and/or nitric acid, preferably having a concentration of no greater than 5 molar. The acid is supplied in excess of te stoichiometric amount required to convert the tungstate to tungstic acid and sufficient to maintain the thusly formed tungstic acid insoluble in the solution. The tungstic acid can then be separated from the solution and converted to soluble ammonium tungstate, which in turn can be converted into tungsten trioxide and finally into metallic tungsten. The tri (alkaline earth metal) tungstate starting material can be prepared from iron tungstate, manganese tungstate, and/or an alkaline earth metal tungstate or from ores or concentrates of these tungstates, by a high temperature treatment with calcium oxide. The tungsten values can be obtained with good yields and low levels of impurities.

5 Claims, No Drawings

TREATMENT OF TRI(ALKALINE EARTH METAL) TUNGSTATES WITH ACIDS

BACKGROUND OF THE INVENTION

1. Field of the Invention

This invention relates to the extraction of tungsten values from tungsten compositions. More particularly, the invention relates to a process for preparing tungstic acid from tri (alkaline earth metal) tungstates, especially from tricalcium tungstate.

2. Prior Art

Various tungsten compositions are known in the art. Calcium forms a tungstate mineral known as scheelite ($CaWO_4$). Calcium also forms a tricalcium tungstate of the formula $Ca_3WO_6$. Iron and manganese form a range of tungstate minerals varying in composition between $FeWO_4$ and $MnWO_4$. These minerals are generally referred to as ferberite, wolframite and huebnerite, depending on the composition of the mineral. Generally, ferberite is used to describe such a mineral containing more than 20% by weight of FeO and heubnerite, when the mineral contains more than 20% by weight of MnO. The intermediate compositions are referred to as wolframite, although this term is often used for the whole range of compositions; such use may be made hereinafter. These various minerals and tungsten compositions are important sources of tungsten trioxide and metallic tungsten.

In conventional processes for recovering tungsten values from scheelite or from wolframite ores, the ores are usually concentrated by gravity, magnetic and/or flotation techniques. The concentrates, so formed, are then processed further. For example, water soluble sodium tungstate can be obtained by fusing a concentrate with sodium carbonate or by contacting a concentrate with hot sodium hydroxide solution. Acidification of the aqueous sodium tungstate solution yields insoluble tungstic acid. Alternatively, tungstic acid can be obtained from the concentrate by leaching the concentrate with a strong acid, such as concentrated hydrochloric acid. The tungstic acid can then be dissolved in a base and processed further to recover other tungsten values.

Frequently ammonium tungstate is formed in known processes as an intermediate, which is then isolated, dried and heated to form tungsten trioxide. The ammonium tungstate is believed to be the paratungstate salt, which may be defined as having the formula $x(NH_4)_2O \cdot yWO_3 \cdot zH_2O$ with, for example, $x=3$ and $y=7$ or $x=5$ and $y=12$, the value of z depending on the conditions of crystallization of the salt. This intermediate can be formed by dissolving tungstic acid in ammonium hydroxide, and subsequently can be converted to tungsten trioxide, tungsten and other useful tungsten compounds by techniques such as those described in K. C. Li and C. Y. Wang, "Tungsten," American Chemical Society Monograph 130, Reinhold Publishing Corporation, New York (1955), especially Chapter IV.

Each of the above-described processes is useful for extracting tungsten values from various tungsten compositions. However, shorter treatment times and lower levels of impurities in products produced with good yields are technically and economically desirable. For example, ammonium tungstate manufactured by known processes is susceptible to contamination by impurities. The concentration of such impurities depends at least in part on the actual process conditions employed in the manufacture of the ammonium tungstate and on the composition of the tungsten ore.

SUMMARY OF THE INVENTION

To achieve at least some of the aforementioned desired decreases in impurities and in treatment time, the present invention provides a process for extracting tungsten values from a tungsten composition comprising treating a tri (alkaline earth metal) tungstate with an aqueous solution of an acid selected from the group consisting of hydrochloric acid, nitric acid and mixtures thereof, at a temperature below the boiling point of the solution, the acid being in excess of the stoichiometric amount required to convert all the tri (alkaline earth metal) tungstate to tungstic acid and maintain the thusly formed tungstic acid insoluble in the solution, and then separating the tungstic acid from the solution. The alkaline earth metal of the tri (alkaline earth metal) tungstate can be selected from the group consisting of calcium, barium, strontium and mixtures thereof, but is preferably calcium. Generally, the concentration of the treatment acid is no greater than 5 molar, with concentrations of no greater than 2 molar being preferred. The preferred treatment acid is hydrochloric acid.

In one embodiment of the process of the invention, the tungstic acid is subsequently converted to a soluble tungstate, preferably ammonium tungstate, which can be converted to tungsten trioxide. The tungsten trioxide can then be converted to metallic tungsten.

In another embodiment of the invention, a tri (alkaline earth metal) tungstate is prepared from a tungsten composition selected from the group consisting of iron tungstate, manganese tungstate, calcium tungstate, strontium tungstate, barium tungstate and mixtures thereof, or from ores or concentrates thereof, by calcining the tungsten composition with an alkaline earth metal donor compound, preferably calcium oxide, at a temperature in the range of 800° to 1400° C., the donor compound being in excess of the stoichiometric amount required to convert the tungsten composition to the tri (alkaline earth metal) tungstate. In still another embodiment of the invention, the process is carried out with a mixture of tri (alkaline earth metal) tungstate, preferably tricalcium tungstate, and finely divided metallic tungsten, the mixture having been prepared by partial reduction at high temperature of an alkaline earth metal tungstate.

DETAILED DESCRIPTION OF THE INVENTION

As used herein, with respect to tri (alkaline earth metal) tungstates and alkaline earth metal donor compounds, the term "alkaline earth metal" includes calcium, strontium and barium, but not beryllium, magnesium and radium. The invention will be described generally hereinafter with reference to calcium as the sole alkaline earth metal. Although calcium is the preferred alkaline earth metal, it can be replaced in whole or in part with strontium and/or barium. The tri (alkaline earth metal) tungstate may contain more than one alkaline earth metal and, if so, it is preferred that one of the alkaline earth metals is calcium.

In the process of the invention, tricalcium tungstate is treated with an aqueous solution of hydrochloric and/or nitric acid. The acid is supplied in excess of the stoichiometric amount required to convert all the tricalcium tungstate to tungstic acid. The stoichiometric balances are as follows:

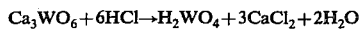

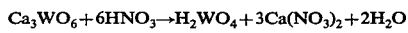

The use of these acids facilitates separation of the products of the treatment process. When the acid is hydrochloric acid, the main products formed are tungstic acid, which is insoluble in the aqueous solution, and calcium chloride which is soluble in the aqueous solution. Thus, the two main products of the treatment process can be separated by, for example, filtration and/or centrifugation techniques. Depending on the actual composition of the material containing the tricalcium tungstate, which will depend on the source of the tricalcium tungstate, other insoluble or soluble products can also be obtained during acid treatment. The nature of these other products can be a factor in the selection of the specific acid and its concentration for use in the process.

The quantity and concentration of acid used in the process of the present invention may be varied over a wide range. The quantity of acid used is at least the stoichiometric amount of acid necessary to convert all of the tricalcium tungstate to tungstic acid, to maintain the tungstic acid insoluble in the solution and to maintain the treatment solution acidic. Some compounds admixed with the tricalcium tungstate may also react with, and consume, some of the acid. However, the amount of excess acid generally should be kept to a minimum consistent with quantitative precipitation of tungstic acid. Some of the excess acid may be absorbed onto the tungstic acid and if any subsequent purification of the tungstic acid involves treatment with a base, additional base would be required to neutralize the absorbed excess acid. Although concentrated acid can be used in the process, the acid generally is not greater than 5 molar and preferably, is not greater than 2 molar.

Other variables that can affect the quantity and concentration of acid used in the process include the pulp density (i.e., the weight of material per 100 ml. of solution), the solubility of calcium chloride or calcium nitrate in the acid solution, the ease of filtration of the solution and the impurities in the starting material bearing the tricalcium tungstate.

The concentration of the treatment acid can have an effect on the impurities in the tungstic acid product and/or on whether the tungsten is maintained in the form of insoluble tungstic acid. For example, it is known that tungsten will form soluble phospho-and arsenotungstates in acid solution. Thus, if the tricalcium tungstate starting material contains phosphates and/or arsenates as impurities, soluble phospho- and/or arsenotungstates may be formed in acid solution, thereby resulting in decreased separation of tungsten as insoluble tungstic acid. The formation of such soluble tungsten compounds is believed to be dependent, in part, on acid concentration and temperature. Accordingly, it is preferable to carry out the process with dilute acid solutions and at relatively low temperatures in order to minimize formation of soluble tungsten compounds. Techniques for the formation and separation of phosphotungstates have been described by H. M. Hubbard et al in U.S. Pat. No. 3,047,361 which issued July 31, 1962. The amount of arsenic compounds may be reduced by roasting an ore prior to calcination to form tri (alkaline earth metal) tungstate.

The time required for treating the tricalcium tungstate with the acid is set by the desired degree of treatment. Such times are relatively short compared with known commercial processes for the treatment of calcium tungstate with concentrated hydrochloric acid. For example, in the process of the present invention the time of treatment of tricalcium tungstate with 1 molar hydrocholric acid solution can be about five minutes. The times of treatment in the embodiments illustrated hereinafter are usually in the range 30 to 120 minutes. The time of treatment will depend at least in part on the particle size of the tricalcium tungstate and on the temperature and pulp density of the leach solution. Preferably the process is operated so that substantially all of the tungsten is converted to insoluble tungstic acid.

The process of the present invention is preferably operated at atmospheric pressure. The process can be operated at temperatures up to the boiling point of the solution. However, the temperature is usually no greater than 50° C. and preferably, in the range of 15° to 35° C.

The process can be operated as a batch or a continuous process, or a mixture thereof when the embodiment of the process is a multi-step process.

In the process of the present invention the tungsten in the tricalcium tungstate is converted into the form of tungstic acid, which is insoluble in the aqueous acidic solution. Techniques for the separation of tungstic acid from the solution and for purification and/or conversion to, for example, tungsten trioxide are know. Such techniques are described in the aforementioned Li and Wang reference. For example, tungstic acid can be separated from the aqueous solution by filtration and then converted to a soluble form, especially as ammonium or alkali metal tungstate, to effect separation of tungsten from other insoluble matter separated from the acidic aqueous solution with the tungstic acid. The ammonium tungstate, or other soluble tungstate, can be purified by conversion to tungstic acid and reconversion to ammonium tungstate; and ammonium tungstate can be converted to tungsten trioxide by heating the ammonium tungstate and then to metallic tungsten by reduction of the tungsten trioxide.

The tricalcium tungstate starting material of the process can be obtained by heating tungsten trioxide with calcium carbonate. However, tricalcium tungstate is preferably obtained by intimately mixing a tungsten-containing compound, especially scheelite or a wolframite ore or concentrate, with an excess of calcium donor compound (e.g., calcium oxide or calcium carbonate) and heating, (i.e., calcining) at a temperature of 800°–1400° C. The temperature should be below the temperature at which fusion or sintering of the mixture occurs, otherwise regrinding of the calcined mixture may be necessary prior to leaching. The quality of the calcium donor compound is preferably such that significant amounts of impurities that might contaminate the subsequently formed tungstic acid, and/or compounds derived therefrom, are not introduced into the tricalcium tungstate. Generally, magnesium salts are not introduced into the tungstate ore or concentrate, because on calcining tri- (calcium, magnesium) tungstates can form and such tungstates are not readily convertible to tungstic acid in the process of the present invention. However, if magnesium is introduced, for example as dolomite, an excess of calcium should be present so that tricalcium tungstate, and not tri (calcium, magnesium) tungstate, can be formed. It is believed that tricalcium tungstate is formed preferentially under such conditions.

If the tungsten-containing compound contains iron, (e.g., a wolframite ore or concentrate) a calcium-iron compound can form during calcination. When less than an excess of calcium donor compound is used during calcination, a calcium/iron tungstate can form which is not readily convertible to tungstic acid during treatment of the tricalcium tungstate with acid. Another calcium-iron compound which can be formed during calcination is a calcium iron oxide which also is not readily leachable in dilute acid. If the tungstic acid formed contains unleached calcium compounds, process problems can result in subsequent treatment (e.g., during purification of the tungstic acid). If the tungstic acid is treated with, for example, ammonia solution, it may be necessary or desirable to treat with an ammonia solution containing an anion, of an insoluble calcium salt such as a carbonate, that is more insoluble in the solution than calcium tungstate thereby preventing precipitation of calcium tungstate. Techniques for the formation of tricalcium tungstate by calcination and for the formation of ammonium tungstate solutions in the presence of calcium are described in more detail in the copending application of H. P. Kasserra, D. B. Kelly and I. Obadia having the same convention priority date as this application.

Tricalcium tungstate can also be obtained by partial reduction at elevated temperature (e.g., 800°–1400° C) of scheelite with, for example, hydrogen. In such reduction processes, finely divided metallic tungsten is also formed. Mixtures of tricalcium tungstate and finely divided metallic tungsten can be treated by an embodiment of the process of the present invention. For example, the tricalcium tungstate can be converted to tungstic acid by treatment with acid as described hereinabove. Subsequently both the finely divided metallic tungsten and the tungstic acid can be converted to ammonium tungstate by leaching with, for example, an aqueous ammonia solution in the presence of an oxidizing agent and optionally, an anion of an insoluble calcium salt, as is described in the copending application of H. P. Kasserra, having the same convention priority date as this application.

Tricalcium tungstate decomposes in water giving calcium tungstate. Tricalcium tungstate can slowly decompose in moist air but is believed to be stable in dry air. It is, therefore, desirable to treat the tricalcium tungstate with acid according to the invention, shortly after formation and/or to protect the tricalcium tungstate from the effects of water until treatment is commenced.

The process of the present invention provides a method for the manufacture of tungsten or tungsten compounds using relatively inexpensive materials to give tungsten or tungsten compounds at potentially economical rates and levels of recovery of tungsten. As the process is operated under relatively mild conditions, the tungsten compounds obtainable are generally less susceptible to contamination by impurities.

The present invention is illustrated by the following examples.

EXAMPLE I

A 20.05 g. sample of tricalcium tungstate that had been prepared by calcining synthetic calcium tungstate with a 5% by mole excess of reagent grade calcium carbonate for 4 hours at 1200° C. was added to 225 ml. of an aqueous solution of 1.54 N hydrochloric acid. The resultant solution was stirred for 30 minutes during which time the temperature increased from ambient temperature to about 40° C. The solution was then filtered and the solids thoroughly washed with distilled water. Analysis of the filtrate by titration with sodium hydroxide solution showed that a 14.5% molar excess of hydrochloric acid had been used. The solids were dried and then roasted at 800° C. for one hour. Highly crystalline tungsten trioxide was obtained with a recovery of 97.7% by weight of the theoretical amount of tungsten in the tricalcium tungstate.

EXAMPLE II

A 20.02 g. sample of the tricalcium tungstate of Example I was treated with acid by the procedure of Example I except that the initial temperature of the solution was 50° C. The recovery of tungsten in the form of tungsten trioxide was 93.4% by weight.

EXAMPLE III

A 20.01 g. sample of tricalcium tungstate, prepared from a commercial scheelite concentrate containing 76.3% by weight of tungsten trioxide by the procedure of Example I, was added to 200 ml. of an aqueous solution of 2.52 N hydrochloric acid. After 30 minutes the solution was filtered and the solids were washed with distilled water. Analysis of the filtrate showed that a 71.4% molar excess of hydrochloric acid had been used. The solids were added to a stirred aqueous saturated solution of ammonia at about 70° C. Ammonia gas was slowly bubbled through the solution. After 3 hours the solution was filtered and the residue washed and dried. The filtrate was evaporated to dryness and the resultant solids were roasted for 2 hours at 750° C. The recovery of tungsten in the form of tungsten trioxide was 96.8% by weight of the theoretical amount of tungsten in the tricalcium tungstate. Analysis of the residue obtained on filtration of the ammonia solution showed the presence of calcium tungstate. This could be a result of incomplete removal of calcium chloride from the acid leach solids, the calcium chloride forming calcium tungstate during treatment of the solids with ammonia.

EXAMPLE IV

A 12.57 g. sample of tricalcium tungstate, prepared from a commercial scheelite concentrate containing 77.2% by weight of tungsten trioxide by the procedure of Example I was added to 250 ml. of a stirred aqueous solution of 2.13 N nitric acid. This quantity of acid was about 70% in excess of the stoichiometric amount required to convert all the tricalcium tungstate to tungstic acid. The solution was at ambient temperature. After 2 hours the solution was filtered and the solids obtained were converted to tungsten trioxide by the procedure of Example III. The recovery of tungsten was 93.2% by weight. X-ray diffraction analysis of the tungsten trioxide indicated the presence of only tungsten trioxide.

EXAMPLE V

A 22.01 g. sample of tricalcium tungstate, prepared from a commercial scheelite concentrate containing 77.2% by weight of tungsten trioxide, was treated with acid by the procedure of Example III, except that the time of the leach was 2 hours. The quantity of acid was about 50% in excess of the stoichiometric amount required to convert all the tricalcium tungstate to tungstic acid. The solids obtained on filtration were added after thorough washing, to a stirred aqueous saturated solution of ammonia at about 70° C. Ammonia gas was slowly bubbled through the solution. After 2 hours the solution was filtered and the residue washed. The filtrate was analyzed for trace impurities by atomic absorption spectroscopy. A portion of the filtrate was evaporated to dryness and the resultant solids were roasted for 2 hours at 750° C. The recovery of tungsten in the form of tungsten trioxide was 90% by weight.

As a comparison, a 20.12 g. sample of the above commercial scheelite concentrate was added to 300 ml. of a boiling concentrate (12 N) solution of hydrochloric acid. After 2 hours, the boiling solution was allowed to cool ambient temperature, filtered and the solids obtained were washed, in sequence, with distilled water, a 5% hydrochloric acid solution and distilled water. The solids were added to a stirred aqueous saturated solution of ammonia at about 70° C. Ammonia gas was slowly bubbled through the solution. After 2 hours the solution was filtered and the residue washed. The filtrate was analyzed for trace impurities by atomic absorption spectroscopy. A portion of the filtrate was evaporated to dryness and the resultant solids were roasted for 2 hours at 750° C. The recovery of tungsten in the form of tungsten trioxide was 98.5% by weight.

The results of the atomic absorption spectroscopy analyses are reported below with the impurities given in parts per million (ppm) based on the weight of tungsten trioxide in the solution analyzed. Note the larger amounts of impurities in the product from the concentrated acid treatment of scheelite compared to the product obtained from the tricalcium tungstate treated according to the present invention.

| | Material Treated with Acid | |
|---|---|---|
| Impurity | $Ca_3WO_6$ per Invention | Sheelite ($CaWO_4$) Comparison |
| Ca | 10 | 15 |
| Mg | 26 | 9 |
| K | 24 | 15 |
| Si | 460 | 1180 |
| Mn | 1 | 2 |
| Fe | 2 | 27 |
| Mo | 165 | 67 |
| Cu | 3 | 11 |
| Total | 691 | 1326 |

EXAMPLE VI

A sample of a commercial ferberite concentrate of −250 mesh and containing 68.6% by weight of tungsten trioxide and 24.1% by weight of iron oxide (FeO) was mixed with a laboratory-grade calcium carbonate so that the molar ratio of calcium to tungsten was 4.4:1. Approximately 300 g. of the mixture were calcined for 4 hours at 1200° C.

A 25.10 g. sample of the calcined mixture was added to 365 ml. of 2 N hydrochloric acid solution. This quantity of acid was about 30% in excess of the stoichiometric requirements. The solution was stirred for 2 hours at ambient temperature and then filtered. The solid residue was washed with a small volume of 2 N hydrochloric acid. The solid residue was treated with saturated ammonia solution as in Example III. The recovery of tungsten in the form of tungsten trioxide, obtained from the ammonia solution, was 79.4% by weight of the theoretical amount of tungsten in the calcined mixture. X-ray fluorescence analysis of the residue remaining after treatment with the ammonia solution showed that the balance of the tungsten was present in the residue. X-ray diffraction showed that tungsten was in the form of calcium tungstate indicating either incomplete leaching of the tricalcium tungstate in the calcined mixture and subsequent conversion to calcium tungstate during treatment with ammonia or incomplete conversion of the tungstate in the ferberite to tricalcium tungstate.

EXAMPLE VII

A sample of commercial wolframite concentrate of −250 mesh and containing 62.3% by weight of tungsten trioxide and 20.8% by weight of iron oxide (FeO) was mixed with a laboratory-grade calcium carbonate so that the molar ratio of calcium to tungsten was 5.0:1. Approximately 250 g. of the mixture were calcined for 4 hours at 1200° C.

A 25.00 g. sample of the calcined mixture was added to 500 ml. of 1.5 N hydrochloric acid solution. The acid was about 45% in excess of the stoichiometric requirements. The solution was stirred for 1 hour at ambient temperature. The pH of the solution (0.2) was adjusted to about 3.0 by the addition of a few milliliters of concentrated ammonia solution. The solution was then stirred for another hour. The solution was filtered and the solid residue washed with dilute hydrochloric acid solution. The solid residue was then treated with saturated ammonia solution as in Example III. The recovery of tungsten in the form of tungsten trioxide obtained from the ammonia solution was 53.4% by weight of the theoretical amount of tungsten in the calcined mixture. X-ray fluorescence analysis of the residue remaining after treatment with the ammonia solution showed the presence of 18.3% of the tungsten. The acid filtrate was shown to contain tungsten.

The result obtained above was shown to be dependent on the pH of the acid treatment solution, the recovery of tungsten in the absence of pH adjustment of the acid solution being 13.2%. The wolframite concentrate contained arsenic (0.35%) which is known to form soluble arsenotungstates in acid solution. This contributed to the low recovery of tungsten as tungsten trioxide.

EXAMPLE VIII

A 200 g. sample of the commercial wolframite concentrate of Example VII was heated for 80 minutes at 800°–850° C. under a stream of nitrogen. Analysis of the concentrate before and after the heat treatment indicated that the arsenic content had been reduced from 0.35% to 0.04%.

A 100 g. sample of the heat-treated wolframite concentrate, now containing 68.2% by weight of tungsten trioxide, was mixed with 150 g. of laboratory-grade calcium carbonate. The mixture was calcined at 1200° C. for 4 hours. X-ray diffraction analysis showed that there was a high conversion of the tungstate of the concentrate into tricalcium tungstate.

A 25.04 g. sample of the above calcined mixture was added to 500 ml. of a 5 N hydrochloric acid solution. The quantity of acid was about 400% in excess of the stoichiometric requirements. The temperature of the solution increased from 25° to 45° C. After stirring for one hour, the solution was filtered and the residue was washed with dilute hydrochloric acid solution and distilled water. The solid residue was treated with a saturated ammonia solution as in Example III. The recovery of tungsten in the form of tungsten trioxide obtained from the ammonia solution was 95.0% by weight of the theoretical amount of tungsten in the calcined wolframite concentrate.

The procedure used in this Example resulted in a significantly higher tungsten recovery than that obtained with the same concentrate in Example VII.

EXAMPLE IX 61.5 g. of synthetic iron tungstate were mixed with synthetic calcium carbonate such that the molar ratio of calcium to tungsten was 4.44:1. The resultant mixture was calcined at 1200° C. for 4 hours. X-ray diffraction analysis showed a high conversion of the iron tungstate to tricalcium tungstate.

Samples of the above product were added to aqueous solutions of hydrochloric acid such that the pulp density was 5 g./100 ml. of solution. The resultant solutions were stirred and then filtered. The solid residue was washed with dilute hydrochloric acid and distilled water. The solid residue was treated with saturated ammonia solution as in Example III. Tungsten trioxide was obtained from the ammonia solution by roasting at a temperature of 800° C. for 30 minutes.

Further experimental details and the results obtained were as follows:

| | Treatment Acid | | | | | |
|---|---|---|---|---|---|---|
| Run No. | Acid | Normality | Excess | Temperature, ° C. | Time Hours | % Recovery of Tungsten |
| 1 | HCl | 1.5 | 40% | Ambient[1] | 2 | 77.4 |
| 2 | HCl | 2.5 | 140% | Ambient | 1.25 | 87.6 |
| 3 | HCl/HNO$_3$[3] | 2.5 | 180% | Ambient | 1.25 | 84.1 |
| 4 | HCl | 2.5 | 200% | 90[2] | 1.25 | 80.7 |

[1]Temperature rose to 40° C.
[2]Temperature rose to 105° C.
[3]Mole ratio of HCl:HNO$_3$ about 8:1.

EXAMPLE X

A sample of commercial scheelite concentrate of −250 mesh and containing 76.9% by weight of tungsten trioxide was reduced with hydrogen at 1200°–1300° C. for 6 hours. Approximately 70–80% of the scheelite was reduced to metallic tungsten, the remainder forming tricalcium tungstate.

A 20.06 g. sample of the reduced scheelite was added to 400 ml. of 2.5 N hydrochloric acid solution through which oxygen was bubbled at a rate of 50 cm$^3$/minute. The solution was agitated vigorously for 6 hours at 50° C. and then filtered. The solid residue was washed and then treated with 400 ml. of a stirred aqueous solution saturated with ammonia for 4 hours at 70° C. After filtration, the resultant filtrate was shown by X-ray fluorescence analysis to contain 28.2% of the theoretical amount of tungsten in the reduced scheelite concentrate. X-ray diffraction of the solid residue showed the presence of metallic tungsten but not tricalcium tungstate. Apparently only the tricalcium tungstate had been leached by the hydrochloric acid solution.

The solid residue was added to 300 ml. of approximately 12% by weight of ammonia solution through which 100 cm$^3$/minute of ammonia gas and 100 cm$^3$/minute oxygen were passed. After stirring for 5 hours at 50° C., the solution was filtered and the solids obtained were washed. X-ray fluorescence analysis of the filtrate showed that 65.9% of the tungsten in the residue (from the first ammonia treatment) had been leached by the ammonia-oxygen leach solution. The overall recovery of tungsten from the reduced scheelite concentrate was 76.2%. The use of an oxidative ammonia leaching, as disclosed in this paragraph, is more fully described in the aforementioned copending application of H. P. Kasserra.

We claim:

1. In a process for extracting tungsten values from a tungsten composition, wherein the tungsten composition is calcined in the presence of an alkaline earth metal compound, cooled, and then treated with hydrochloric acid, nitric acid or mixtures thereof to dissolve impurities from the composition and to retain the tungsten values in a solid residue from which the tungsten values are subsequently recovered, the improvement comprising:

selecting the tungsten composition to be calcined from the group consisting of iron tungstate, manganese tungstate, an alkaline earth metal tungstate and mixtures thereof;

performing the calcining at a temperature of 800° of 1400° C with the alkaline earth metal compound being a donor compound which donates alkaline earth metal to the tungstate of the tungsten composition to form a tri (alkaline earth metal) tungstate, the donor compound being present in an amount in excess of the stoichiometric quantity required to convert the tungstate of the tungsten composition to the tri (alkaline earth metal) tungstate, and the alkaline earth metal of the donor compound being selected from the group consisting of calcium and mixtures of calcium and at least one of strontium and barium; and carrying out the treatment with acid having a concentration of no greater than 5 molar and at a temperature of no greater than 50° C.

2. The process of claim 1 wherein the temperature of the treatment with acid is between 15° and 35° C and the acid concentration is no greater than 2 molar.

3. The process of claim 1 wherein the tungsten composition is a sheelite ore or concentrate and the alkaline earth metal of the donor compound consists essentially of calcium.

4. The process of claim 3 wherein the donor compound is calcium carbonate.

5. In a process for extracting tungsten values from a tungsten composition, wherein the tungsten composition is heated at elevated temperatures, cooled and then treated with hydrochloric acid, nitric acid or mixtures thereof to dissolve impurities from the composition and to retain tungsten values in a solid residue from which the tungsten values are subsequently recovered, the improvement comprising:

selecting the tungsten composition to be heated from the group consisting of alkaline earth metal tungstates and mixtures thereof;

heating the tungsten composition at 800° to 1400° C in a reducing atmosphere to form a mixture of tri (alkaline earth metal) tungstate and finely divided metallic tungsten;

carrying out the treatment with acid having a concentration of no greater than 5 molar and at a temperature of no greater than 50° C and thereafter treating the solid residue with an aqueous ammonia solution in the presence of an excess of an oxidizing agent, the quantity of ammonium ions being sufficient to react with a substantial fraction of the tungsten values in the solid residue to form soluble ammonium tunstate, and then separating the thusly formed ammonium tungstate solution from the remaining insoluble matter.

* * * * *